No. 727,998. PATENTED MAY 12, 1903.
W. J. PATTERSON.
CHUTE.
APPLICATION FILED FEB. 5, 1903.
NO MODEL.
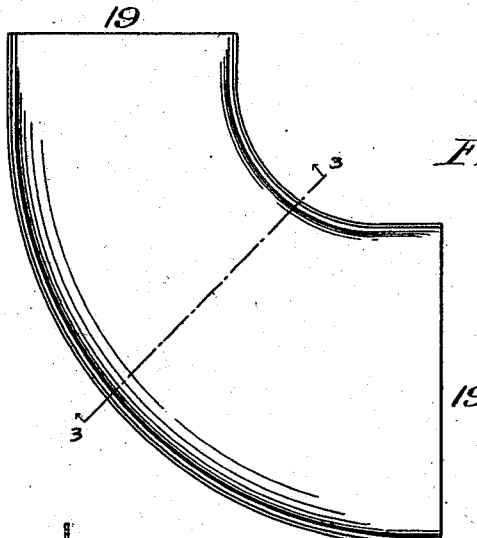
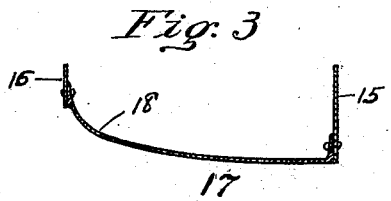
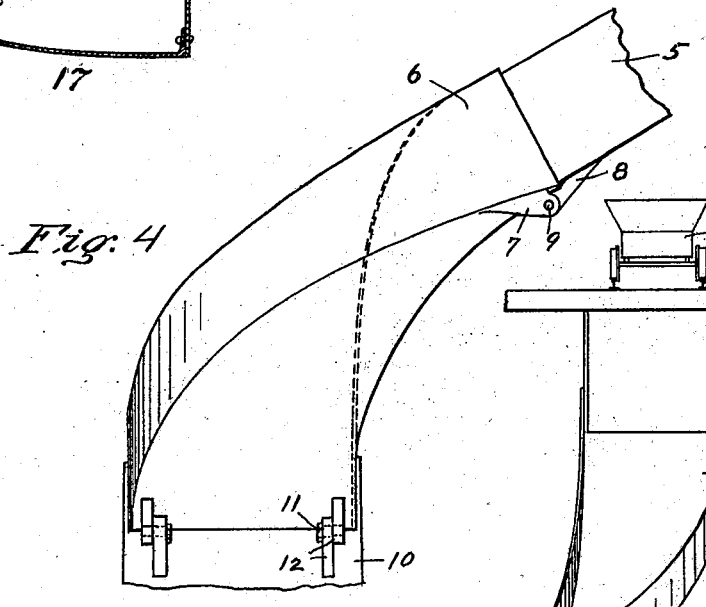
Witnesses.
Inventor.
Attorneys.

No. 727,998. Patented May 12, 1903.

UNITED STATES PATENT OFFICE.

WILLIAM J. PATTERSON, OF PITTSBURG, PENNSYLVANIA, ASSIGNOR TO HEYL AND PATTERSON, OF PITTSBURG, PENNSYLVANIA, A CORPORATION OF PENNSYLVANIA.

CHUTE.

SPECIFICATION forming part of Letters Patent No. 727,998, dated May 12, 1903.

Application filed February 5, 1903. Serial No. 141,957. (No model.)

*To all whom it may concern:*

Be it known that I, WILLIAM J. PATTERSON, a resident of Pittsburg, in the county of Allegheny and State of Pennsylvania, have invented a new and useful Improvement in Chutes; and I do hereby declare the following to be a full, clear, and exact description thereof.

My invention relates to chutes, and more especially to a chute-section for use in connection with unloading and loading apparatus, where the material is discharged into a receptacle located at right angles to the original direction of discharge.

The object of my invention is to provide a curved chute adapted to connect up two sections of chutes at right angles to each other and in such a manner as to prevent the collection of the material at one side of the chute and distribute it more evenly, so that the chute will not become clogged or overflow at this junction, where the curve occurs, and will deliver the material evenly on the lower chute, screen, or receptacle.

To these ends my invention comprises, generally stated, a curved chute for connecting two main chutes at right angles to each other, the bottom of said chute for a portion of its length sloping from the long side toward the short side, so that as the material in its descent from one chute strikes the long side of the curved chute the slope of the long side will tend to carry the material toward the short side of the chute, and thus prevent the collecting of the material on the long side and will deliver the material evenly to the lower chute.

To enable others skilled in the art to make and use my invention, I will describe the same more fully, referring to the accompanying drawings, in which—

Figure 1 represents a suitable coal-discharging apparatus in connection with which my invention may be used. Fig. 2 is an enlarged plan view of my improved chute. Fig. 3 is a cross-section on the line 3 3, Fig. 2. Fig. 4 is a bottom view of my improved chute, and Fig. 5 is a section of a chute made entirely of cast metal.

Like numerals indicate like parts in each of the figures.

I have illustrated my invention in connection with a suitable form of coal-discharging apparatus, in which the numeral 2 designates a suitable framework, having a track 3 supported thereon and adapted to convey the cars 4 to the discharging-point.

The numeral 5 designates a chute supported in the frame and in line with the discharge of the pit-cars 4. To the lower end of the chute 5 is connected my improved curved chute 6, the upper end of said curved chute having lugs 7, adapted to be attached to the lugs 8 on the lower end of the chute 5 by pins or bolts 9, said chute being of a width corresponding to the size of the discharge of the main chute 5. The lower end of the chute 6 is slightly contracted to fit within the chute 10 and is connected with said chute 10 by means of pins 11 passing through lugs 12 on chutes 6 and 10. The chute 10 directs the material into a car adapted to be run into position to receive the material discharged from the chute.

The chute 6 may be formed of cast-iron, as in Fig. 5, or the bottom portion only may be formed of cast-iron, the sides 15 and 16 being formed of wrought metal riveted to the bottom, as shown in Fig. 3, or, if desired, the entire chute may be made of wrought metal. The inner or short side 15 is substantially straight, so as to form an abrupt or steep inner face, while the bottom 17 slopes from the long side toward the short side of the chute in such a way as to form a grade 18 toward the short side, which will tend to cause the material discharged therein to slide over toward the short side 15 and avoid the crowding of the coal on the long side. This sloping portion or grade 18 of the bottom 17 does not extend the entire length of the chute, but only for a portion of its length, beginning at a suitable distance from each end, so that the bottom portions 19 of the chute adjacent to the ends of the chutes 5 and 10 correspond with the bottoms of said chutes 5 and 10 and coincide therewith.

When my improved chute is in use, when connected up with the other chutes in the manner described the coal or other material will be discharged into the main chute 5 and will pass therefrom into the curved chute 6 and will descend with considerable force and speed and will naturally accumulate along the long side of the chute 6 first. Owing to the slope or grade 18 of the bottom, the material will tend to slide or move over toward the short side 15 of the chute and will then continue on its way to the chute 10 below. This will prevent the crowding or collecting of the coal on the long side of the curved chute 6 and will prevent congestion and distribute the coal more evenly, so that the descent through the chute 6 will be continuous and a more perfect screening or loading will result.

What I claim is—

1. A curved chute having its bottom sloping from the long side toward the short side.

2. A curved chute having its bottom sloping from the long side toward the short side for a portion of said bottom intermediate of its ends.

3. A curved chute having its bottom sloping from the long side to or about the middle of said bottom and in the direction of the short side.

4. A curved chute having its bottom sloping from the long side toward the short side for a portion of its length, the portions adjacent to the ends of said chute corresponding to the bottoms of the adjoining chutes.

5. A curved chute having its bottom formed of cast metal sloping from the long side toward the short side, and wrought-metal sides secured to said bottom.

In testimony whereof I, the said WILLIAM J. PATTERSON, have hereunto set my hand.

WILLIAM J. PATTERSON.

Witnesses:
ROBERT C. TOTTEN,
FRED D. SWEET.